US007161137B2

(12) United States Patent
Ura et al.

(10) Patent No.: US 7,161,137 B2
(45) Date of Patent: Jan. 9, 2007

(54) OPTICAL TRANSDUCER SYSTEM HAVING LIGHT EMITTING ELEMENTS AND LIGHT DETECTING ELEMENTS BOTH REGULABLE IN OUTPUT CHARACTERISTICS

(75) Inventors: Tomoyuki Ura, Shizuoka-ken (JP); Tsutomu Sasaki, Shizuoka-ken (JP); Yasuhiko Ohba, Shizuoka-ken (JP); Masahisa Hashimoto, Shizuoka-ken (JP)

(73) Assignee: Yamaha Corporation, Hamamatsu (JP)

( * ) Notice: Subject to any disclaimer, the term of this patent is extended or adjusted under 35 U.S.C. 154(b) by 14 days.

(21) Appl. No.: 11/027,944

(22) Filed: Jan. 4, 2005

(65) Prior Publication Data

US 2005/0145781 A1 Jul. 7, 2005

(30) Foreign Application Priority Data

Jan. 6, 2004 (JP) ............................ 2004-001235

(51) Int. Cl.
*G01V 8/10* (2006.01)
*G01J 1/34* (2006.01)
*G01J 1/28* (2006.01)

(52) U.S. Cl. ............................ 250/222.1; 250/227.22; 250/205

(58) Field of Classification Search ................ 250/221, 250/222.1, 205, 227.22; 341/7, 11, 13, 31; 84/13, 19, 639, 724
See application file for complete search history.

(56) References Cited

U.S. PATENT DOCUMENTS 5,231,283 A 7/1993 Starkey et al.
5,567,902 A 10/1996 Kimble et al.
5,677,688 A * 10/1997 O'Mara et al. ............... 341/31
5,824,930 A 10/1998 Ura et al.
5,909,028 A * 6/1999 Yamamoto .................. 250/221
6,229,081 B1 5/2001 Ura et al.
6,297,437 B1 * 10/2001 Ura et al. ................. 84/423 R
6,359,207 B1 * 3/2002 Oba et al. ..................... 84/658

FOREIGN PATENT DOCUMENTS

EP 0 987 677 A 3/2000
JP 9-54584 A 2/1997
JP 2000-155571 A 6/2000

* cited by examiner

*Primary Examiner*—Stephone B. Allen
*Assistant Examiner*—Davienne Monbleau
(74) *Attorney, Agent, or Firm*—Smith Patent Office

(57) ABSTRACT

Keys, which are incorporated in an automatic player piano, are monitored with an optical transducer system. The optical transducer system includes sensor heads provided on both sides of the key trajectories, LEDs connected to predetermined sensor heads through optical fibers, LDDs connected to the other sensor heads through optical fibers and a controlling unit. A luminescence controller is connected to the LEDs for optimizing the luminescence, and bias controllers are respectively connected to the LDDs. The luminescence controller and bias controllers optimize the luminescence of emitted light and the bias level of electric signals so that the optical transducer system is free from the individuality of component parts and the deterioration.

21 Claims, 10 Drawing Sheets led(x)

| CHO(Yn) | C | C# | D | D# | E | F | ··· |
|---|---|---|---|---|---|---|---|
| | 0 | 0 | 0 | 0 | 0 | 0 | ··· |
| ch1 | 7 | 7 | 7 | 7 | 7 | 7 | |
| ch2 | 7 | 7 | 7 | 7 | 7 | 7 | |
| ch3 | 7 | 7 | 7 | 7 | 7 | 7 | |
| ch4 | 7 | 7 | 7 | 7 | 7 | 7 | |
| ch5 | 7 | 7 | 7 | 7 | 7 | 7 | |
| ⋮ | | | | | | | |

Fig. 7 A led(x)

| CHO(Yn) | C | C# | D | D# | E | F | ··· |
|---|---|---|---|---|---|---|---|
| | 1 | 1 | 1 | 1 | 1 | 1 | ··· |
| ch1 | 7 | 7 | 7 | 7 | 7 | 7 | |
| ch2 | 7 | 7 | 7 | 7 | 7 | 7 | |
| ch3 | 7 | 7 | 7 | 7 | 7 | 7 | |
| ch4 | 7 | 7 | 7 | 7 | 7 | 7 | |
| ch5 | 7 | 7 | 7 | 7 | 7 | 7 | |
| ⋮ | | | | | | | |

Fig. 7 B led(x)

| CHO(Yn) | C | C# | D | D# | E | F | ··· |
|---|---|---|---|---|---|---|---|
| | 1 | 1 | 1 | 1 | 1 | 1 | ··· |
| ch1 | 0 | 0 | 0 | 0 | 0 | 0 | |
| ch2 | 0 | 0 | 0 | 0 | 0 | 0 | |
| ch3 | 0 | 0 | 0 | 0 | 0 | 0 | |
| ch4 | 0 | 0 | 0 | 0 | 0 | 0 | |
| ch5 | 0 | 0 | 0 | 0 | 0 | 0 | |
| ⋮ | | | | | | | |

Fig. 7 C led(x)

| CHO(Yn) | C | C# | D | D# | E | F | ··· |
|---|---|---|---|---|---|---|---|
| | 1 | 1 | 1 | 1 | 1 | 1 | ··· |
| ch1 | 1 | 1 | 1 | 0 | 0 | 0 | |
| ch2 | 1 | 1 | 1 | 1 | 0 | 0 | |
| ch3 | 0 | 1 | 1 | 1 | 0 | 0 | |
| ch4 | 0 | 0 | 0 | 0 | 0 | 0 | |
| ch5 | 0 | 0 | 0 | 0 | 0 | 0 | |
| ⋮ | | | | | | | |

Fig. 7 D led(x)

| CHO(Yn) | C | C# | D | D# | E | F | ··· |
|---|---|---|---|---|---|---|---|
| | 1 | 1 | 1 | 1 | 1 | 1 | ··· |
| ch1 | 1 | 2 | 2 | 0 | 0 | 0 | |
| ch2 | 2 | 2 | 2 | 1 | 0 | 0 | |
| ch3 | 0 | 2 | 2 | 1 | 0 | 0 | |
| ch4 | 0 | 0 | 0 | 0 | 0 | 0 | |
| ch5 | 0 | 0 | 0 | 0 | 0 | 0 | |
| ⋮ | | | | | | | |

Fig. 7 E led(x)

| CHO(Yn) | C | C# | D | D# | E | F | ··· |
|---|---|---|---|---|---|---|---|
| | 1 | 1 | 1 | 1 | 1 | 1 | ··· |
| ch1 | 1 | 2 | 2 | 0 | 0 | 0 | |
| ch2 | 2 | 3 | 3 | 1 | 0 | 0 | |
| ch3 | 0 | 2 | 3 | 1 | 0 | 0 | |
| ch4 | 0 | 0 | 0 | 0 | 0 | 0 | |
| ch5 | 0 | 0 | 0 | 0 | 0 | 0 | |
| ⋮ | | | | | | | |

Fig. 7 F led(x)

| CHO(yn) | C 3 | C# 3 | D 3 | D# 3 | E 3 | F 3 | ··· |
|---|---|---|---|---|---|---|---|
| ch1 | 0 | 0 | 0 | 0 | 0 | 0 | |
| ch2 | 0 | 0 | 0 | 0 | 0 | 0 | |
| ch3 | 0 | 0 | 0 | 0 | 0 | 0 | |
| ch4 | 0 | 0 | 0 | 0 | 0 | 0 | |
| ch5 | 0 | 0 | 0 | 0 | 0 | 0 | |
| ⋮ | | | | | | | |

Ka

Fig. 9A led(x)

| CHO(yn) | C 2 | C# 2 | D 2 | D# 2 | E 2 | F 2 | ··· |
|---|---|---|---|---|---|---|---|
| ch1 | 0 | 0 | 0 | 0 | 0 | 0 | |
| ch2 | 0 | 0 | 0 | 0 | 0 | 0 | |
| ch3 | 0 | 0 | 0 | 0 | 0 | 0 | |
| ch4 | 0 | 0 | 0 | 0 | 0 | 0 | |
| ch5 | 0 | 0 | 0 | 0 | 0 | 0 | |
| ⋮ | | | | | | | |

Fig. 9B led(x)

| CHO(yn) | C 2 | C# 2 | D 2 | D# 2 | E 2 | F 2 | ··· |
|---|---|---|---|---|---|---|---|
| ch1 | 0 | 1 | 1 | 0 | 0 | 0 | |
| ch2 | 1 | 1 | 1 | 0 | 0 | 0 | |
| ch3 | 0 | 1 | 1 | 0 | 0 | 0 | |
| ch4 | 0 | 0 | 0 | 0 | 0 | 0 | |
| ch5 | 0 | 0 | 0 | 0 | 0 | 0 | |
| ⋮ | | | | | | | |

Fig. 9C led(x)

| CHO(yn) | C 2 | C# 2 | D 2 | D# 2 | E 2 | F 2 | ··· |
|---|---|---|---|---|---|---|---|
| ch1 | 0 | 1 | 1 | 0 | 0 | 0 | |
| ch2 | 1 | 2 | 2 | 0 | 0 | 0 | |
| ch3 | 0 | 1 | 2 | 0 | 0 | 0 | |
| ch4 | 0 | 0 | 0 | 0 | 0 | 0 | |
| ch5 | 0 | 0 | 0 | 0 | 0 | 0 | |
| ⋮ | | | | | | | |

Fig. 9D

OPTICAL TRANSDUCER SYSTEM HAVING LIGHT EMITTING ELEMENTS AND LIGHT DETECTING ELEMENTS BOTH REGULABLE IN OUTPUT CHARACTERISTICS

FIELD OF THE INVENTION

This invention relates to an optical transducer system and, more particularly, to an optical transducer system for converting a physical quantity to an electric signal.

DESCRIPTION OF THE RELATED ART

An optical transducer is incorporated in a hybrid keyboard musical instrument such as, for example, an automatic player piano and a mute piano. A typical example of the prior art optical transducer is disclosed in Japanese Patent Application laid-open No. Hei 9-54584. The Japanese Patent Application laid-open is corresponding to Japanese Patent Application No. Hei 7-270322, which offered the Convention Priority right to U.S. Ser. No. 08/658,700. The U.S. Patent Application was patented, and U.S. Pat. No. 5,824,930 was assigned to the U.S. Patent Application.

The priority optical transducer is installed in the acoustic piano, and includes twelve light emitting diodes, eight light detecting diodes, sensor heads, shutter plates and optical fibers. A shutter plate and a pair of sensor heads are assigned to each of the black/white keys. Each shutter plate is attached to the lower surface of one of the black and white keys, and each pair of sensor heads is assigned to one of the black and white keys. The sensor heads are disposed on both sides of the trajectory of the shutter plate, and light is radiated from one of the sensor heads to the other sensor head across the trajectory of the shutter plate.

The eighty-eight black and white keys selectively belong to twelve key groups, and the twelve light emitting diodes are respectively assigned to the twelve key groups. Eight or less than eight keys form one of the twelve key groups as shown in FIG. 1. Twelve columns stand for the key groups, and the pitch names are representative of the black and white keys of the twelve key groups. For example, the keys assigned the pitch names C1 to C8 form one of the key groups, and the keys assigned the pitch names C#1 to C#8 form another key group. Each of the twelve light emitting diodes is optically coupled to the sensor heads under the black and white keys of the associated key group through the optical fibers. Thus, the light is concurrently supplied from each light emitting diode to eight sensor heads.

The eight light detecting diodes are respectively connected to the other sensor heads under the black and white keys of each key group through the optical fibers. Since the black and white keys of each key group are eight at the maximum, the light is concurrently propagated to the eight light detecting diodes through eight channels ch1 to ch8.

While the prior art optical transducer is monitoring the black and white keys, the twelve light emitting diodes are repeatedly energized with a driving signal as indicated by arrow AR1, and the light is sequentially supplied from the twelve light emitting diodes to the sensor heads associated with the twelve key groups. When the light emitting diode assigned to the leftmost key group is energized with the driving signal, the light is concurrently supplied to the sensor heads under the white keys C1 to C8, and the eight light beams are concurrently radiated across the trajectories of the shutter plates to the associated sensor heads. Subsequently, the light emitting diode assigned to the key group on the right side of the leftmost column, and the eight light beams are concurrently radiated across the trajectories of the shutter plates to the associated sensor heads. Thus, twelve time slots, which are respectively assigned to the twelve light emitting diodes, are repeated, and the light concurrently returns through the eight channels ch1 to ch8 to the eight light detecting diodes in each time slot.

While the black and white keys are staying at the rest positions, the shutter plates make the amount of light at the light detecting diodes maximum. The amount of light at the light detecting diodes is gradually reduced during the travel from the rest position to the end position. The photo-current serves as an electric signal expressing the current key position measured from the rest position, and the data processor determines the current key positions of the eighty-eight keys depending upon the amount of light incident on the light detecting diodes.

If the prior art optical transducer were free from the aged deterioration and soil, the data processor would request the tone generator to produce an audio signal expressing the tones to be produced at proper loudness. However, the premises are not satisfied in the actual optical transducers. In fact, the current-to-light characteristics of the light emitting diodes are varied together with time, and the sensor heads become dirty with dust over a long term of years. In this situation, it is impossible for the data processor accurately to determine the current key positions.

A countermeasure is proposed in Japanese Patent Application laid-open No. 2000-155571. The Japanese Patent Application laid-open is corresponding to Japanese Patent Application No. Hei 11-59445, which offered the Convention Priority Right to U.S. Ser. No. 09/396,097. The U.S. Patent Application was patented, and U.S. Pat. No. 6,229,081B1 was assigned thereto.

The prior art optical transducer system disclosed in Japanese Patent Application laid-open No. 2000-155571 is based on the prior art optical transducer described hereinbefore, and includes a current regulating circuit, amplifiers, analog-to-digital converters and a central processing unit. The current regulating circuit is connected to the light emitting diodes, and varies the amount of driving current supplied to the light emitting diodes under the control of the central processing unit. The amplifiers and the analog-to-digital converters are connected between the light detecting diodes and the central processing unit, and the amount of photo current is reported from the analog-to-digital converter to the central processing unit as digital key position signals. The central processing unit checks the amount of photo current to see whether or not the light-and-electric characteristics are unintentionally varied. If the answer is given affirmative, the central processing unit requests the current regulating circuit stepwise to increase the driving current so as strongly to energize the light emitting diodes. Thus, the individuality of the light emitting diodes and aged deterioration are compensated in the prior art optical transducer system.

Assuming now that the central processing unit notices reduction in the amount of photo-current in a certain time slot, the central processing unit requests the current controlling circuit to increase the driving current supplied to the light emitting diode assigned the time slot. Then, the light emitting diode increases the luminance, and the large amount of light is distributed to the associated sensor heads. This results in that the light detecting diodes concurrently increase the amount of photo-current. Thus, the current controlling circuit makes the key position signals accurately express the current key positions. However, a problem is encountered in the prior art optical transducer system in the accuracy of the key position signals or detecting signals.

SUMMARY OF THE INVENTION

It is therefore an important object of the present invention to provide an optical transducer system, which produces detecting signals accurately expressing a physical quantity of moving objects.

The present inventors contemplated the problem inherent in the prior art optical transducer system, and noticed that irregularity was still left among the digital key position signals after the regulation of driving current supplied to the light emitting diodes. The present inventors specified the origin of the irregularity. Although the light emitting elements were regulated through the current controlling circuit, the light detecting elements still introduced the irregularity due to the individuality thereof and aged deterioration into the detecting signals. The present inventors concluded that the regulation was to be carried out on the final optical elements such as the light detecting elements.

In accordance with one aspect of the present invention, there is provided an optical transducer system for monitoring at least one moving object on a trajectory comprising a current-to-light converting unit supplied with current for radiating light toward said trajectory at a luminescence, a light-to-current converting unit receiving the light and producing an electric signal representative of a physical quantity expressing motion of the at least one moving object on the trajectory and varied in dependence on the motion and the luminescence, a bias controller connected to the light-to-current converting unit and responsive to a bias control signal representative of a target bias level for regulating the electric signal to the target bias level, and a data processor supplying the bias control signal to the bias controller, and receiving the electric signal so as to determine the physical quantity.

BRIEF DESCRIPTION OF THE DRAWINGS

The features and advantages of the optical transducer system will be more clearly understood from the following description taken in conjunction with the accompanying drawings, in which FIGS. 7A to 7F are views showing the state of the digital key position signals in the optimization, FIGS. 9A to 9D are views showing the state of digital key position signals in the optimization.

DESCRIPTION OF THE PREFERRED EMBODIMENTS

In the following description, term "front" is indicative of a position closer to a player, who sits on a stool for fingering, than a position modified with "rear". A line drawn between a front position and a corresponding rear position extends in "fore-and-aft direction", and the fore-and-aft direction crosses a lateral direction at right angle.

First Embodiment

Figure 2:
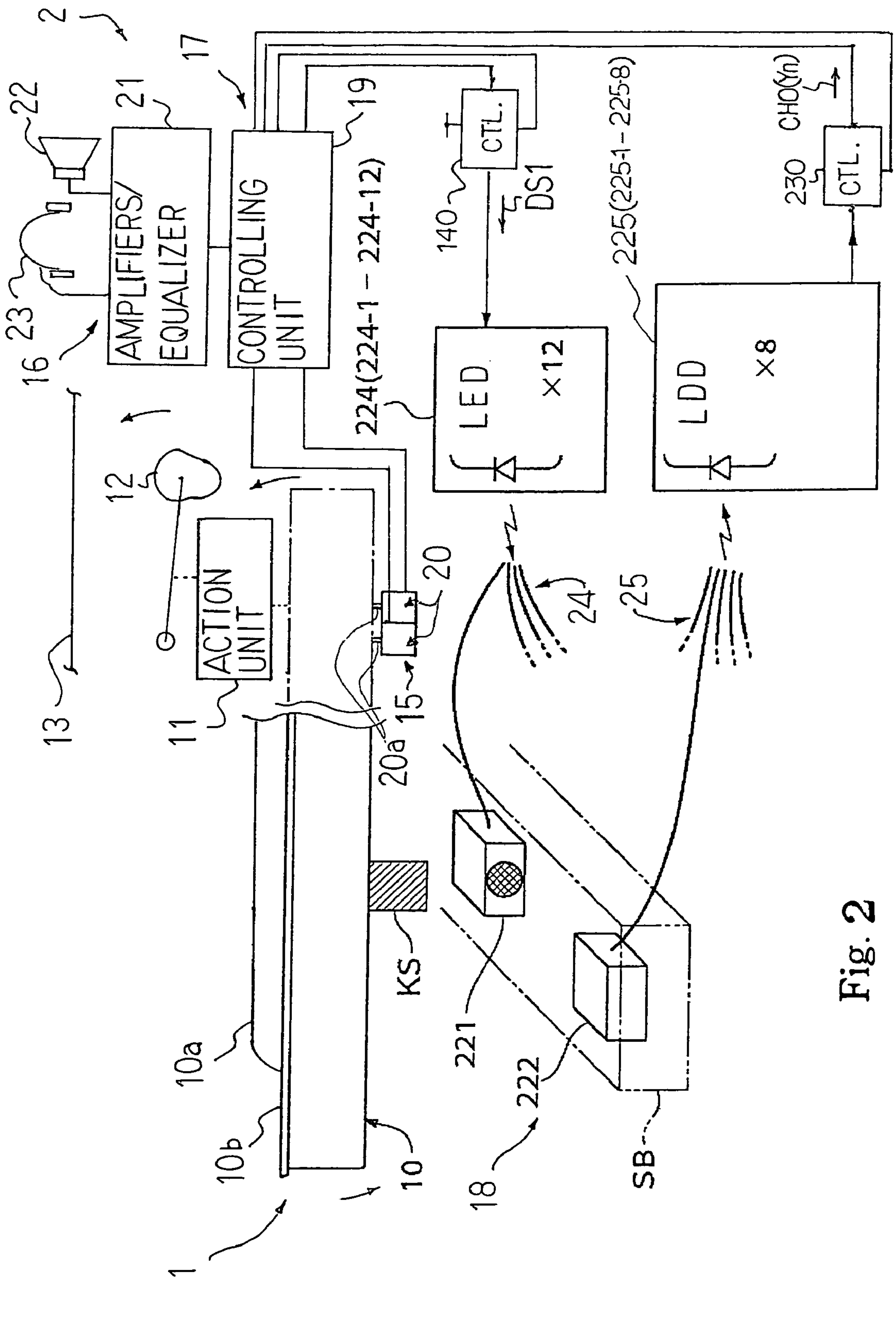
FIG. 2 is a schematic view showing an automatic player piano according to the present invention.

Referring to FIG. 2 of the drawings, an automatic player piano embodying the present invention largely comprises an acoustic piano 1 and an electronic system 2. A pianist fingers a piece of music on the acoustic piano 1, and acoustic piano tones are radiated from the acoustic piano 1. The electronic system 2 is installed in the acoustic piano 1, and gives two options to users. When a user instructs the electronic system 2 to perform a piece of music through the acoustic piano tones, the electronic system 2 produces the acoustic piano tones without any fingering of a human pianist. On the other hand, when the user takes the other option, the electronic system 2 produces electronic tones also without any fingering.

The acoustic piano 1 includes a keyboard 10, action units 11, hammers 12 and strings 13. Black keys 10*a* and white keys 10*b* are incorporated in the keyboard 10, and are laid on the well-known pattern. The black and white keys 10*a*, 10*b* are linked with the action units 11, respectively, and the hammers 12 are held in contact with the associated action units 11 under the strings 13. When external force is exerted on the black and white keys 10*a*, 10*b*, the external force gives rise to the angular motion of the black and white keys 10*a*, 10*b*, and the black and white keys 10*a*, 10*b* drive the action units 11 to escape from the hammers 12. Then, the hammers 12 start to rotate toward the associated strings 13, and strike the associated strings 13 so as to give rise to vibrations of the strings 13. Thus, the component parts 10, 11, 12 and 13 of the acoustic piano 1 behave as similar to those of a standard piano.

The electronic system 2 is broken down into an automatic player 15, an electronic sound generator 16, a recorder 17 and an optical transducer system 18. The automatic player 15 analyzes pieces of music data representative of a performance, and selectively drives the black and white keys 10*a*, 10*b*for reenacting the performance without any fingering. The electronic sound generator 16 also analyzes the pieces of music data, and produces the electric tones along the music passage. The recorder 17 converts a performance on the acoustic piano 1 to pieces of music data, and stores the pieces of music data in a suitable information storage medium.

The optical transducer system 18 cooperates with the recorder 17. The optical transducer system 18 sends out eighty-eight light beams across the trajectories of the black and white keys 10*a*, 10*b*, respectively, and determines the current key positions of the black and white keys 10*a*, 10*b* on the basis of the amount of light passing through the trajectories. In other words, the optical transducer system 18 monitors the black and white keys 10*a*, 10*b* with the light beams, and converts the current key positions to key position signals. The current key positions expressed by the key position signals fall at the ends of the queues respectively assigned to the black and white keys 10*a*, 10*b*. The recorder 17 periodically analyzes the pieces of key position data in each queue to see whether or not a note-on event or a note-off event takes place. When the recorder 17 notices at least one black and white keys 10*a*, 10*b* depressed, the recorder 17 specifies a key code assigned to the depressed at least one black and white keys 10*a*, 10*b*, and calculates a velocity, which is proportional to the loudness of the acoustic piano tone, on the basis of the pieces of key position data. The recorder 17 further determines the lapse of time from the previous event to the note-on event, and the note-on event, key code, velocity and lapse of time are coded in predetermined formats. In this instance, the formats used for the recording are defined in the MIDI (Musical Instrument Digital Interface) protocols. On the other hand, when the recorder 17 notices the at least one of the black and white keys released, the recorder 17 specifies the key code, and determines the lapse of time from the previous event. The recorder produces the music data codes representative of the note-off event, key code and lapse of time. Thus, the recorder 17 is assisted with the optical transducer system 18 for recording the performance. As will be described hereinlater in detail, some component parts of the electronic system 2 are shared among the automatic player 15, electronic sound generator 16, recorder 17 and optical transducer system 18.

The optical transducer system 18 is able to change the light output characteristics and current output characteristics. The digital key position signals are assumed incorrectly to express the current key positions due to the individuality of the component parts and aged deterioration. The optical transducer system 18 varies the luminescence of each light beam, i.e., the light output characteristics and the light-to-photo current characteristics, i.e., current output characteristics so as to recover itself to the initial optical characteristics. Since the current output characteristics are variable, the key position signals always accurately express the current key positions on the respective trajectories.

The automatic player 15 includes a controlling unit 19 and an array of solenoid-operated key actuators 20. The solenoid-operated key actuators 20 are respectively provided under the rear portions of the black/white keys 10*a*/10*b*, and the tips of plungers 20*a* are in the close proximity of the lower surfaces.

The automatic player 15 includes a controlling unit 19 and an array of solenoid-operated key actuators 20. The solenoid-operated key actuators 20 are respectively provided under the rear portions of the black and white keys 10*a*, 10*b*, and the tips of plungers 20*a* are in the close proximity of the lower surfaces.

A user is assumed to instruct the automatic player 15 to reenact a performance. The music data codes representative of the performance are supplied to the controlling unit 19, and the controlling unit 19 sequentially analyzes the music data codes for determining reference trajectories, which are series of target key positions varied with time for the black and white keys 10*a*, 10*b* to be pushed with the plungers 20*a*. When the controlling unit produces the reference trajectory for at least one of the black and white keys 10*a*, 10*b*, the controlling unit 19 calculates a target velocity on the basis of the pieces of target key position, and determines the amount of driving current, i.e., the duty ratio of the driving signal. The controlling unit 19 supplies the driving signal to the solenoid-operated key actuator 20 under the at least one of the black and white keys 10*a*, 10*b* so that the plunger 20*a* upwardly projects. The plunger 20*a* gives rise to the key motion, and supplies a feedback signal representative of the current plunger position. The controlling unit 19 calculates the plunger velocity, and compares the current plunger position and current plunger velocity with the target key position and target key velocity to see whether or not the at least one of the black and white keys 10*a*, 10*b* travels on the reference trajectory. When the answer is affirmative, the controlling unit 19 keeps the driving signal at the duty ratio. On the other hand, if the answer is given negative, the controlling unit 19 determines a proper duty ratio, and adjusts the driving signal to the proper duty ratio.

When the music data code representative of the note-off reaches the controlling unit 19, the controlling unit 19 removes the driving signal from the solenoid-operated key actuator 20 under the at least one of the black and white keys 10*a*, 10*b* to be released. Then, the plunger 20*a* is retracted, and the hammer 12 and action unit 11 cause the at least one of the black and white keys 10*a*, 10*b* to return to the rest position.

The recording system 17 includes the controlling unit 19, and cooperates with the optical transducer system 18 as described hereinbefore. The optical transducer system 18 includes the controlling unit 19, light radiating sensor heads 221, light receiving sensor heads 222, twelve current-to-light converters 224, eight light-to-current converters 225, optical fibers 24, optical fibers 25, a luminescence controller 140 for the current-to-light converters 224, a bias controller 230 for the light-to-current converters 225 and optical modulators KS. The optical modulators KS are respectively attached to the lower surfaces of the front portions of the black and white keys 10*a*, 10*b*, and travel together with the associated black and white keys 10*a*, 10*b* along the key trajectories. The light radiating sensor heads 221 and light receiving sensor heads 222 are housed in a photo-shield box SB, and the photo-shield box SB is formed with slits (not shown) respectively assigned to the optical modulators KS. The luminescence controller 140 is provided in association with the current-to-light converters 224, and varies the amount of current supplied to the current-to-light converters 224. On the other hand, the bias controller 230 is provided in association with the light-to-current converters 225, and varies the default potential level of each key position signal. The term "default potential level" means a potential level of the light-to-current converter 225 at the rest position of the associated black and white keys 10*a*, 10*b*. Thus, not only the driving signals DS1 but also key position signals are independently adjusted to proper values. This results in that the optical sensor system 18 is free from the individuality and aged-deterioration of the current-to-light converters 224 and the light-to-current converters 225.

Reference numeral 224 stands for all of or any one of the twelve current-to-light converters 224-1 to 224-12, and reference numeral 225 stands for all of or any one of the eight light-to-current converters 225-1 to 225-8. However, when a particular current-to-light converter and a particular light-to-current converter is to be specified, the particular current-to-light converter and particular light-to-current converter are designated by reference numeral 224-1, 224-2, . . . or 224-12 and reference numeral 225-1, 225-2, . . . or 225-8.

The current-to-light converters 224 are, by way of example, implemented by semiconductor light emitting diodes LED, and semiconductor light detecting diodes LDD serve as the light-to-current converter 225. When the current-to-light converter 224 is energized with electric current, the light beam is radiated from the current-to-light converter 224, and the luminescence is varied together with the amount of electric current or the magnitude of a driving signal DS1 supplied from the controlling unit 19. The light-to-current converters 225 generate the photo-current in the presence of the light, and the amount of photo-current is varied together with the amount of light received.

The light radiating sensor heads 221 are respectively paired with the light receiving sensor heads 222, and the pairs of sensor heads 221, 222 are respectively associated with the eighty-eight black and white keys 10*a*, 10*b*. The light radiating sensor head 221 is laterally spaced from the associated light receiving sensor head 222, and the slit is formed over the gap between the light radiating sensor head 221 and the light receiving sensor head 222. The light beam is bridged over the gap, and has the diameter of the order of 5 millimeters. For this reason, while the associated at least one of the black and white keys is traveling from the rest position to the end position, the optical modulator KS gradually intersects the light beam between the light radiating sensor head 221 and the light receiving sensor head 222 inside the photo-shield box SB, and the amount of light incident on the light receiving sensor head 222 is also gradually reduced. Thus, the light is modulated with the optical modulator KS depending upon the current key position.

The optical fibers 24 and 25 are selectively connected between the current-to-light converters 224 and the light radiating sensor heads 221 and between the light receiving sensor heads 222 and the light-to-current converters 225. The optical fibers 225 offer eight channels ch1 to ch8 to the light incident on the light receiving sensor heads 222. The assignment of the twelve current-to-light converters 224 and assignment of the eight light-to-current converters 225 are same as those shown in FIG. 1. In this instance, the twelve current-to-light converters 224-1 to 224-12 are sequentially energized with the driving signal DS1 at intervals of 0.12 millisecond. Twelve time slots form a frame, and the frame is repeated for the twelve current-to-light converters 224-1 to 224-12.

One of the current-to-light converters 224 assigned the black/white keys C1 to C8 (see FIG.1) is assumed to be energized with the driving signal DS1. The light is distributed through the optical fibers 24 to the light radiating sensor heads 221 under the black and white keys C1 to C8, and the eight light beams are concurrently radiated to the associated light receiving sensor heads 222. The eight light beams are respectively modulated with the optical modulators KS, and the modulated light beams are incident on the associated light receiving sensor heads 222. The incident light is propagated through the optical fibers 25 to the eight light-to-current converters 225, and is converted to the photo-current. The next time slot comes. The next current-to-light converter, which is associated with the black and white keys C#1 to C#8, is energized with the driving signal DS1, and the light is distributed to the associated light radiating sensor heads 221. The light beams are also modulated with the optical modulator KS, and the modulated light is incident on the associated light receiving sensor heads 222. The incident light is also propagated to the eight light-to-current converters 225, and is converted to the photo-current. Thus, the twelve current-to-light converters 224-1 to 224-12 are sequentially energized with the driving signal DS1 in the time slots, and the incident light is converted to the photo-current through the light-to-current converters 225-1 to 2258 in each time slot.

Figure 3:
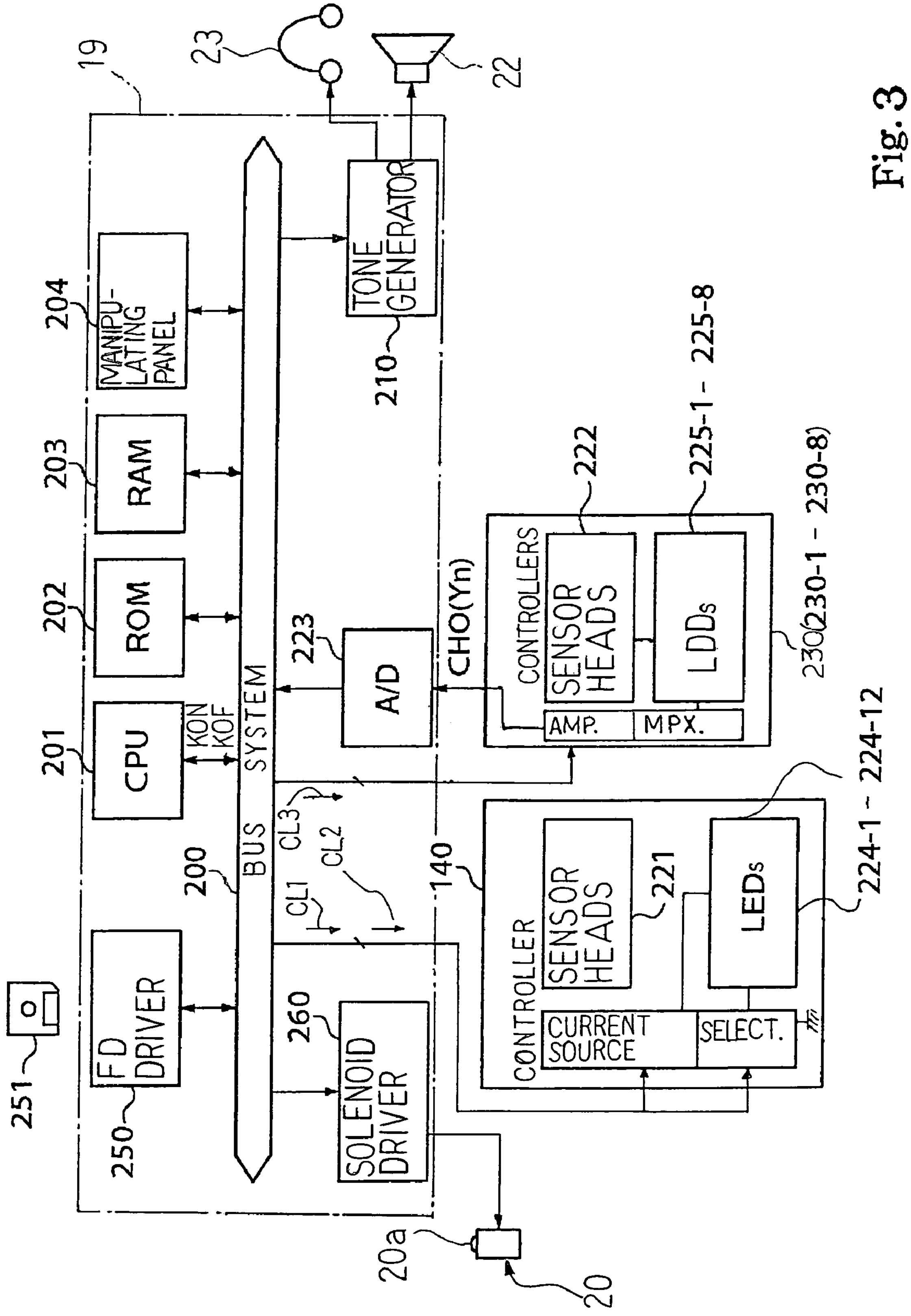
FIG. 3 is a block diagram showing the system configuration of a controlling unit incorporated in the automatic player piano.

Turning to FIG. 3 of the drawings, the controlling unit 19 includes a bus system 200, a central processing unit 201, which is abbreviated as "CPU", a read only memory 202, which is abbreviated as "ROM", a random access memory 203, which is abbreviated as "RAM" and a manipulating panel 204. The central processing unit 201, read only memory 202, random access memory 203 and manipulating panel 204 are connected to the bus system 200 so that the central processing unit 201 is electronically connectable to the read only memory 202, random access memory 203 and manipulating panel 204 through the bus system 200.

Programmed instruction codes and parameter tables are stored in the read only memory 202, and the central processing unit 201 sequentially fetches the instruction codes for given jobs. In this instance, when the controlling unit 19 is energized, the central processing unit 201 starts to run on a main routine program, and the main routine program conditionally branches into subroutine programs for the recording and playback.

The random access memory 203 offers a temporary data storage or a working memory for the central processing unit 201, and the central processing unit 201 creates a key state table assigned to the black and white keys 10*a*, 10*b* and other tables for the recording. Flags, software timers and queues of pieces of key position data are also created in the random access memory 203. While a user is fingering on the keyboard 10 in the recording mode, the music data codes are temporarily stored in the random access memory 203.

The manipulating panel 204 serves as a man-machine interface, and has plural keys, switches, levers, indicators and a display window. Users give their instructions to the central processing unit 201 through the keys, switches and levers, and the central processing unit 201 produces prompt messages and other messages expressing current status and so forth through the display windows and indicators. While the central processing unit 201 runs on the main routine program, the central processing unit 201 periodically checks the manipulating panel 204 to see whether or not the user gives a new instruction through the keys, switches and levers, and requests the manipulating panel 204 to drive the indicators and display window to display the messages and indicate the current status in both main and subroutine programs.

The controlling unit 19 further includes a tone generator 210, analog-to-digital converters 223, a floppy disk driver 250 and a solenoid driver 260. Though not shown in FIG. 3, signal input/output circuits are further connected between the bus system 200 and the luminescence controller 140 and bias controllers 230-1, 230-2, . . . and 230-8. The central processing unit 201 supplies a luminescent control signal CL1 and a select signal CL2 to the luminescence controller 140 and a potential control signal CL3 to the bias controller 230 through the signal input/output circuits.

The tone generator 210 is activated in the electronic tone generation, and includes waveform memories, data readers and envelope generators. Pieces of waveform data are stored in the waveform memories for the electronic tones, and the data readers are responsive to the music data codes representative of the note-on event and note-off event. The pieces of waveform data are selectively read out from the waveform memories by the data readers, and each of the envelop generators gives an attack, a decay and a sustain to the pieces of waveform data for producing a digital audio signal representative of an electric tone, and controls the release rate RL of the digital audio signal. The amplitude is controlled on the basis of the piece of music data representative of the velocity, which the music data code representative of the note-on event contains. After the digital-to-analog conversion, the analog audio signal are supplied through the amplifiers/equalizer 21 (see FIG. 2) to the loud speakers/headphone 22/23.

The analog-to-digital converters 223 is connected between the signal input/output circuit (not shown) and the bus system 200. The analog key position signals CHO(Yn) or CHO(Y1), CHO(Y2), . . . CHO(Y8) are supplied from the light-to-current converters 225-1, 225-2, . . . 225-8 through the bias controller 230, which is the collective noun for bias controllers 2301-1, 230-2, . . . 230-8, and the signal input-output circuits to the analog-to-digital converters 223. Discrete values are periodically sampled from the analog key position signals CHO(Y1), CHO(Y2), . . . CHO(Y8), and are converted to the digital key position signals. When the user instructs the central processing unit 201 the entry into the recording mode, the central processing unit 201 periodically enters the subroutine program for the recording, and the digital key position signals are fetched by the central processing unit 201 during the execution on the subroutine program. The central processing unit 201 puts the pieces of key position data, which are expressed by the digital key position signals, at the ends of the associated queues in the random access memory 203.

The central processing unit 201 analyzes the pieces of the key position data in the queues to see whether or not the pianist depresses or releases any one of the black and white keys 10*a*, 10*b*. When the central processing unit 201 notices the pianist depressing at least one of the black and white keys 10*a*, 10*b*, the central processing unit specifies the depressed key, and calculates the velocity on the basis of the pieces of key position data. The central processing unit 201 produces the music data code KON representative of the note-on event, and the key code representative of the depressed key and key velocity are written in the music data code KON. The central processing unit 201 further acquires the lapse of time from the previous event from the software timer, and writes the lapse of time in a duration code. The music data code KON and duration code are transferred to the random access memory 203, and are stored therein. On the other hand, when the central processing unit 201 notices the pianist releasing the depressed key, the central processing unit 201 specifies the released key, and determines the release rate. The central processing unit 201 produces the music data code KOF representative of the note-off event, and the key code and release rate are written in the music data code KOF. The central processing unit 201 also determines the lapse of time from the previous event, and produces the duration data. The music data code KOF and duration code are transferred to the random access memory 203, and are stored therein.

The floppy disk driver 250 is also connected to the bus system 200, and a set of music data codes representative of a performance and associated duration codes is transferred between the floppy disk driver 250 and the random access memory 203 under the control of the central processing unit 201. Upon completion of the recording, the central processing unit 201 transfers the set of music data codes and associated duration codes from the random access memory 203 to the floppy disk driver 250, and requests the floppy disk driver 250 to store the set of music data codes and associated duration codes into a floppy disk 251. The term "floppy disk" is a trademark. On the other hand, when the user instructs the central processing unit 201 to reproduce the piece of music. The floppy disk driver 250 reads out the set of music data codes and associated duration codes from the floppy disk 251, and transfers the set of music data codes and associated duration codes to the random access memory 203.

The solenoid driver 260 is also connected to the bus system 200, and control codes representative of a target duty ratio are supplied from the central processing unit 201 to the solenoid-driver 260 in the automatic playing mode. The solenoid driver 260 adjusts the driving signals to the target duty ratio, and supplies the driving signals to the solenoid-operated key actuators 20 associated to the black and white keys 10*a*, 10*b* to be moved. Though not shown in FIG. 3, the plunger sensors, which monitor the plungers 20*a*, form feedback loop together with the signal input-output circuits, analog-to-digital converters and central processing unit 201, and the plunger motion is controlled through the feedback loop so as to cause the black and white keys 10*a*, 10*b* exactly to travel along the reference trajectories.

Figure 4:
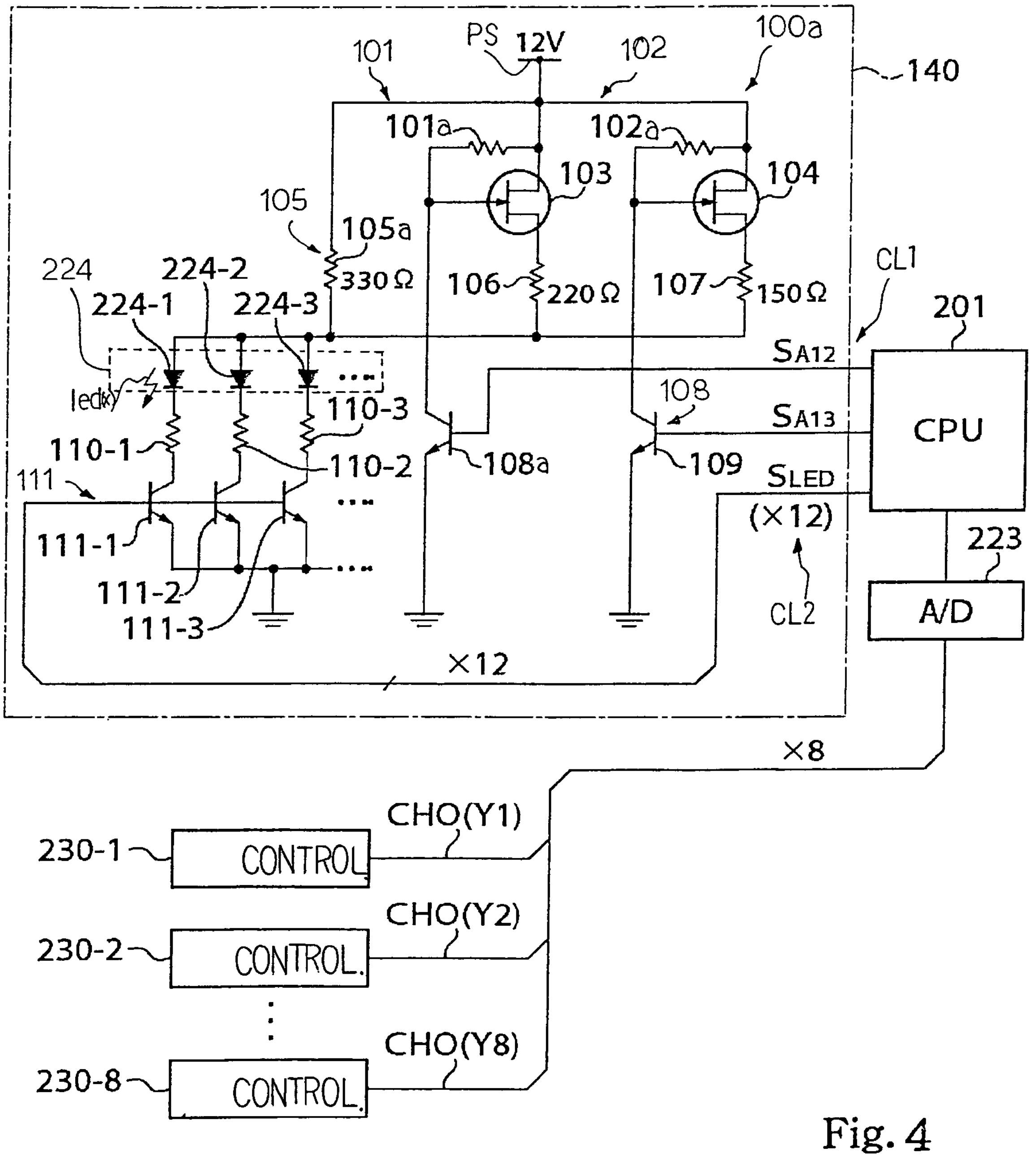
FIG. 4 is a circuit diagram showing the circuit configuration of a controller for current-to-light converters incorporated in the automatic player piano.

Turning to FIG. 4 of the drawings, the luminescence controller 140 for the current-to-light converters includes a variable current source 100*a* and a selector 111. The variable current source 100*a* is connected between a power source PS and the current-to-light converters 224, and the selector 111 is connected between the current-to-light converters 224 and the ground. The variable current source 100*a* is responsive to the luminescent control signal CL1 so as to vary the amount of current supplied to the current-to-light converters 224. On the other hand, the selector 111 is responsive to the select signal CL2 so as selectively to connect the current-to-light converters 224-1 to 224-12 to the ground. Thus, the central processing unit 201 optimizes the current supplied to each of the current-to-light converters 224-1 to 224-12.

The variable current source 100*a* includes the constant current sources 101, 102, a register array 105 and a selector 108. The constant current sources 101, 102 are connected in parallel between the power source PS and the register array 105, and the register array 105 is connected at one end to the power source PS and constant current sources 101, 102 and at the other end to the current-to-light converters 224-1 to 224-12. For this reason, the minimum current flows directly into the current-to-light converters 224, and the amount of current flowing into the current-to-light converters 224 is varied depending upon the constant current sources 101 and 102.

The selector 108 is connected between the constant current sources 101, 102 and the ground. The selector 108 is responsive to the luminescent control signal CL1 so as to make the constant current sources 101, 102 selectively active. When the luminescent control signal CL1 is indicative of the constant current source 101, the selector 108 permits the constant current source 101 to flow the current to the register array 105, and the current flows from the constant current source 101 through the resistor array 105 to the current-to-light converters 224. On the other hand, when the select signal CL2 is indicative of the other current source 102, the selector 108 permits the constant current source 102 to flow the current through the resistor array 105 to the current-to-light converters 224. The resistance against the current from the constant current source 102 is different from the resistance against the current from the constant current source 101 so that the amount of the current flowing into the current-to-light converters 224 is varied. If the select signal CL2 is indicative of both constant current sources 101, 102, the selector 108 make both constant current sources 101, 102 active, and the current flows from both constant current sources 101, 102 through the resistor array 105 to the variable current path 105. Thus, the amount of current flowing into the current-to-light converters 224 or luminescence led(x) is stepwise varied with the luminescent control signal CL1.

The constant current source 101 is similar in circuit configuration as the constant current source 102. Each of the constant current sources 101, 102 includes a resistor 10l*a*, 102*a* and a p-channel enhancement type filed effect transistor 103, 104. The p-channel enhancement type field effect transistor 101a, 102a has the source node connected to the power source PS, drain node connected to the variable resistor 105 and the gate electrode directly connected to the selector 108 and indirectly to the source node through the resistor 101a, 102a. The p-channel enhancement type field effect transistor 101a is equal in current driving capability to the other p-channel enhancement type field effect transistor 102a.

While the luminescent control signal CTL1 is keeping the potential level at the gate electrode of the p-channel enhancement type field effect transistor 108a, 109 at the ground level, the selector 108 disconnects the gate electrode from the ground, and the gate electrode is equal in potential level to the source node. For this reason, the p-channel enhancement type field effect transistor 101a, 102a is turned off, and, accordingly, any current does not flow through the constant current source 101, 102.

The multi-bit luminescent control signal $S_A$12, $S_A$13, i.e., CL1 is assumed to rise the potential level at the base node of the n-p-n type bipolar transistor 108a, 109a to the high level, the bipolar transistor 108a, 109a turns on, and connects the gate electrode of the p-channel enhancement type field effect transistor 101a, 102a to the ground. Then, the gate electrode becomes lower than the source node, and the p-channel enhancement type field effect transistor 101a, 102a turns on. The current starts to flow into the resistor array 105. Thus, the amount of current or luminescence led(x) is increased.

The resistor array 105 has resistors 105a, 106 and 107, the resistance of which is 330 ohms, 220 ohms and 150 ohms. The resistor 105a is connected between the power source PS and the current-to-light converters 224, and the resistors 106, 107 are connected in parallel between the constant current sources 103, 104 and the current-to-light converters 224. The minimum current always flows through the resistor 105a. As described hereinbefore, the central processing unit 201 selectively changes the bits $S_A$12, $S_A$13 of the luminescent control signal CL1 to the active high level, the selector 108 makes the associated constant current source 101, 102 start to flow the current. The constant current source 101 is assumed to flow the current. The resistance R against the current is given as 1/330+1/220=1/R. The resistance R is 132 ohms. Thus, the resistance is reduced, and the amount of current is increased. If the central processing unit 201 changes the bit $S_A$13 to the active high level, the resistance R is given as 1/330+1/150=1/R. The resistance R is 103 ohms, and the amount of current is further increased. When the central processing unit 201 maximizes the current, the central processing unit 201 changes both bits $S_A$12, $S_A$13 to the active high level. Then, the resistance R is given as 1/330+1/220+1/150=1/R. The resistance R is 70 ohms, and the amount of current flowing into the current-to-light converters 224 is maximized. The luminescence or the amount of light is proportionally increased together with the amount of current flowing into the current-to-light converter 224. Thus, the luminescence controller 140 can vary the luminescence led(x) or amount of light in response to the luminescent control signal CL1.

The twelve current-to-light converters 224-1, 224-2, 224-3, . . . are respectively connected at the anodes to the resistor array 105 and at the cathodes to resistors 110-1, 110-2, 110-3, . . . The selector 111 includes n-p-n bipolar transistors 111-1, 111-2, 111-3, . . . , which are connected at the collector nodes to the resistors 110-1, 110-2, 110-3, . . . and at the emitter nodes to the ground. The 12-bits $S_{LED}$ of the select signal CL2 are respectively supplied to the base nodes of the n-p-n bipolar transistors 111-1, 111-2, 111-3, . . . Thus, the central processing unit 201 makes the n-p-n bipolar transistors 111-1, 111-2, 111-3 . . . sequentially turn on with the select signal CL2.

While the central processing unit 201 is keeping all the bits $S_{LED}$ at the ground level, the n-p-n bipolar transistors 111-1, 111-2, 111-3, . . . , are turned off, and any current does not flow through the current-to-light converters 224-1 to 224-12. In this situation, the potential difference between the anodes and the cathodes is less than the threshold, and any current-to-light converter 224 does not emit the light.

The central processing unit 201 sequentially raises the bits $S_{LED}$ to the active high level. In other words, all the bits $S_{LED}$ periodically rises to the active high level. The central processing unit 201 is assumed to change the first bit to the active high level. The n-p-n bipolar transistor 111-1 turns on, and the current flow through the associated current-to-light converter 224-1 and n-p-n bipolar transistor 111-1 to the ground. Then, the potential level between the anode and the cathode exceeds the threshold, and the current-to-light converter 224-1 starts to emit the light.

The luminescence led(x) is varied together with the amount of current flowing into the current-to-light converter 224. When the central processing unit 201 changes both bits $S_A$12 and $S_A$13 to the active high level, the luminescence led(x) is maximized, and led(0) is indicative of the maximum luminescence. When the central processing unit 201 changes the bit $S_A$13 to the active high level and the other bit $S_A$12 to the low level, the luminescence led(x) is decreased to led(1). When the central processing unit 201 changes the bit $S_A$12 to the active high level and the other bit $S_A$13 to the inactive low level, the luminescence led(x) is further decreased to led (2). When the central processing unit 201 keeps both bits $S_A$12 and $S_A$13 at the inactive low level, the luminescence led(x) is minimized to led(3).

Figure 5:
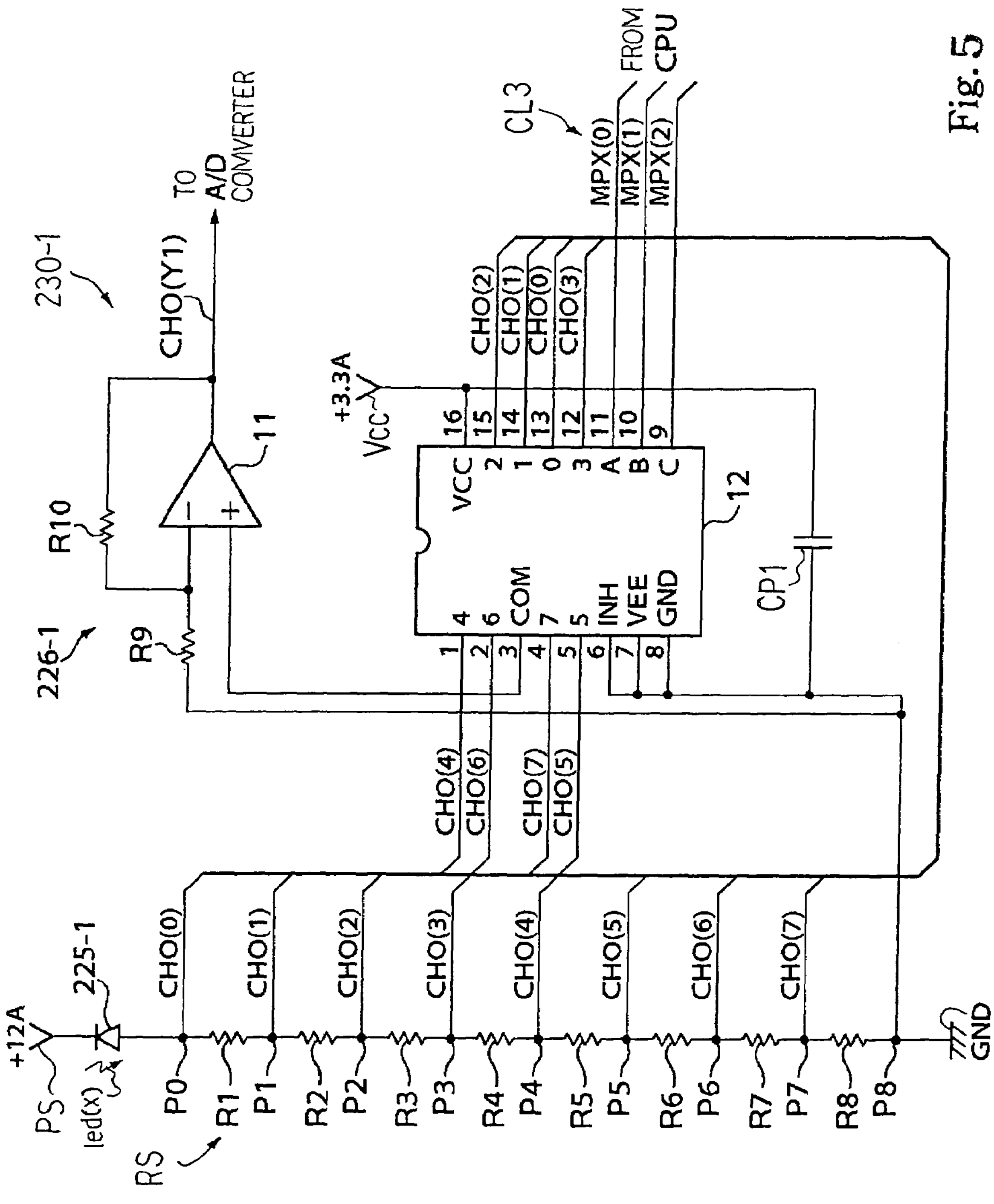
FIG. 5 is a circuit diagram showing the circuit configuration of a controller for light-to-current converters.

Turning to FIG. 5 of the drawings, one 230-1 of the bias controllers 230-1 to 230-8 for the light-to-current converters 225-1 includes a resistor string RS, a multiplexer 12 and an amplifier 226-1. The other bias controllers 230-2 to 230-8 are similar in circuit configuration to the bias controller 230-1, and, for this reason, description is focused on the bias controller 230-1. The light-to-current converter 225-1 is connected at the cathode to the power source, and the resistor string RS is connected between the associated light-to-current converter 225-1 and the ground GND. The multiplexer 12 has plural input nodes 1, 2, 3, 4, 5, 6, and 7, which are respectively connected to the output nodes P1, P2, P3, P4, P5, P6 and P7. The multiplexer 12 further has control nodes A, B and C, to which the bits of the control signal CL3 are respectively supplied, and an output node COM, which is connected to the amplifier 226-1. The multiplexer 12 is responsive to the control signal CL3 so as to transfer the potential level at one of the input nodes 1–7 to the output node COM, and the potential level at the output node COM is supplied to the amplifier 226-1. The potential level at the output node COM is amplified through the amplifier 226-1, and, thereafter, is supplied to the analog-to-digital converter 223 as the key position signal CHO(Y1).

The resistor string RS has plural resistors R1, R2, R3, R4, R5, R6, R7 and R8, and the output nodes P0/P8 and P1 to P7 are connected to the anode of the light-to-current converter 225-1/ground GND and the intermediate nodes among the resistors R1 to R7. While the light-to-current converter 225-1 is being radiated with the light at led(x), photo current flows through the resistors R1 to R8, and generates potential levels CHO(1), CHO(2), CHO(3), CHO (4), CHO(5), CHO(6) and CHO(7) at the output nodes P0 to P7, respectively. Since the potential level at the output node P8 is equal to the ground level, the potential levels CHO(O) to CHO(7) are given through the proportional distribution to the output nodes P0 to P7. The potential level CHO(0) at the output node P0 is assumed to be V0. The potential level CHO(1) at the next output node P1 is given as V0×(7/8), and the potential level CHO(2) at the output node P2 is given as V0×(6/8). Thus, the potential level CHO(0) is the highest of all, and the lowest potential level CHO(7) takes place at the output node P7.

The connection to the input nodes 1–7 and control nodes A to C and the connection from the output node COM are described hereinbefore. The multiplexer further has a potential node VCC and other potential nodes GND, VEE and INH. The potential node VCC is connected to a power source Vcc, which is lower in potential level than the power source PS, and the ground level is applied from the ground GND to the other potential nodes GND, VEE and INH. Since the power source Vcc is connected through a capacitor CP1, the potential level at the power source Vcc is stable.

The amplifier 226-1 includes an operational amplifier 11 and resistors R9 and R10. The output node COM is connected to the non-inverted input node (+) of the operational amplifier 11, and the output node P8 is connected through the resistor R9 to the inverted node (−) of the operational amplifier 11. The inverted node (−) is connected to the output node of the operational amplifier 11 through the resistor R10. Thus, the resistors R9 and R10 gives the gain, which is equal to the ratio of resistance between the resistors R9 and R10, to the operational amplifier 11, and the potential level at the output node COM is amplified by the gain. The operational amplifier 11 supplies the key position signal CHO(Y1) to the analog-to-digital converter 223.

Figure 6:
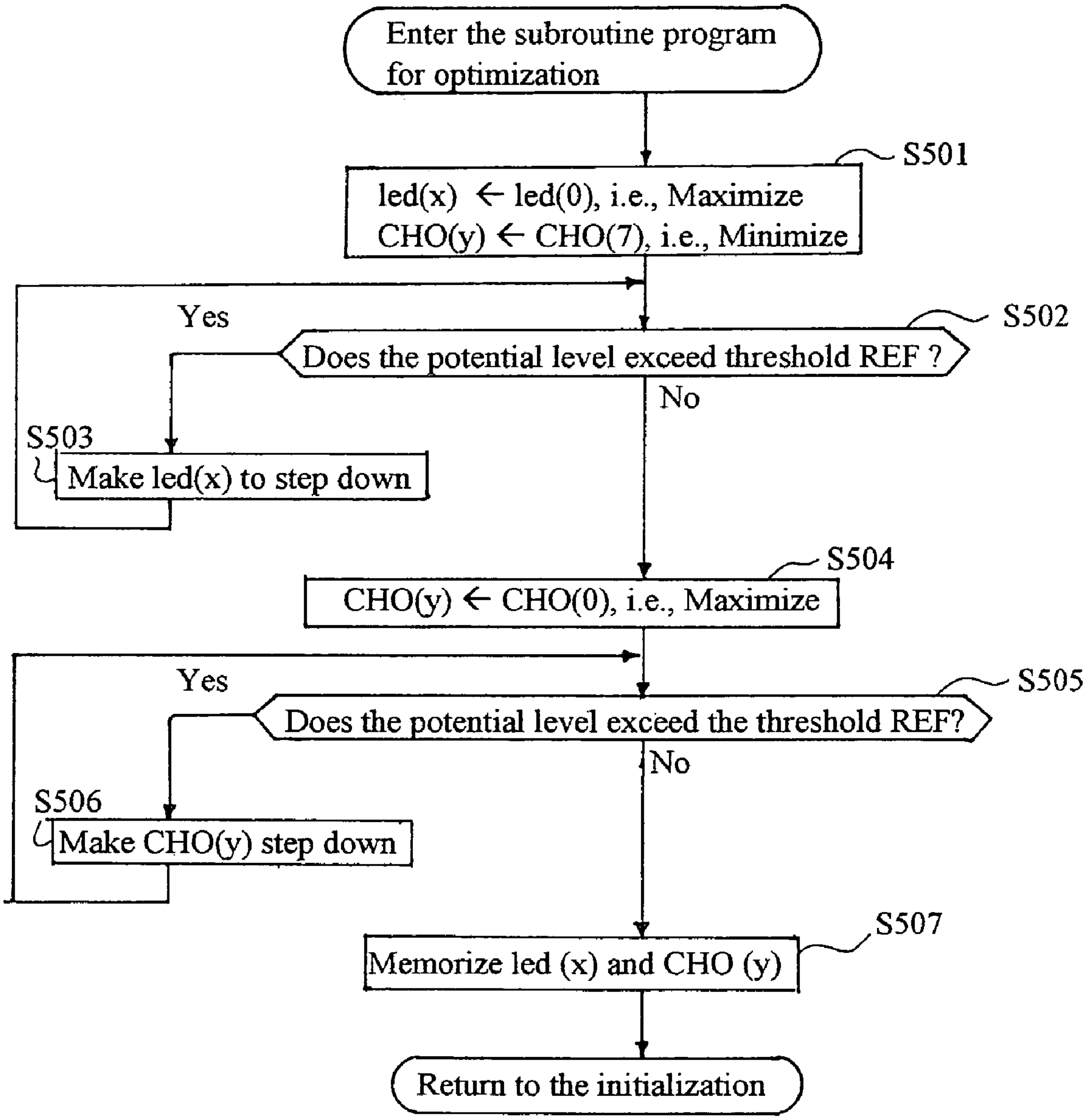
FIG. 6 is a flowchart showing a method for optimizing an optical transducer system according to the present invention.

The central processing unit 201 optimizes the current-to-light converters 224-1 to 224-12 and light-to-current converters 225-1 to 225-8 as follows. FIG. 6 shows a method for optimizing the current-to-light converters 224-1 to 224-12 and light-to-current converters 225-1 to 225-8. When the optical transducer system 18 is powered, the central processing unit 201 starts to initialize the system, and enters a subroutine program for the optimization during the initialization.

The central processing unit 201 firstly changes both bits $S_A$12 and $S_A$13 to the active high level, and changes the potential control signal CL3 to the bit pattern MPX(0)/MPX (1)/MPX(2) indicative of the input node "7". Then, the current-to-light converters 224 get ready to emit the light at the maximum luminescence led(0), and the multiplexer 12 transfers the minimum potential level CHO(7) from the input node "7" to the output node COM as by step S501.

The select signal CL2 is assumed to indicate the current-to-light converter 224-1. The current-to-light converter 224-1 emits the light at the maximum luminescence led(0), and the light is radiated from the light radiating sensor heads 221 to the adjacent light receiving sensor heads 222. The incident light is propagated to the light-to-current converters 225-1 to 225-8, and each light-to-current converter 225 produces the photo current from the incident light. The photo current flows through the resistor strings RS, and the potential levels at the output nodes CHO(7) are transferred through the multiplexers 12 to the amplifiers 226-1 to 226-8. The potential levels at the output nodes CHO(7) are amplified through the amplifiers 226-1 to 226-8, and, thereafter, are supplied to the analog-to-digital converters 223 as the key position signals CHO(Y1) to CHO(Y8). The central processing unit 201 fetches the digital key position signals, and stores the binary values in the random access memory 203. The central processing unit 201 changes the select signal CI2 to the bit pattern indicative of the next current-to-light converter 224-2, and fetches the digital key position signals CHO(Y1) to CHO(Y8) so as to store the binary values in the random access memory 203. In this way, the central processing unit 201 sequentially changes the select signal CL2 to the next bit pattern, and stores the binary values in the random access memory 203.

When the central processing unit writes the binary values in the random access memory 203 for the last current-to-light converter 224-12, the binary values for all the combinations between the current-to-light converters 224-1 to 224-12 and the light-to-current converters 225-1 to 225-8 are stored in the random access memory 203. Then, the central processing unit 201 compares the binary values of the digital key position signals with a threshold REF to see whether or not any one of the binary values exceeds the threshold REF as by step S502. The threshold REF is determined in such a manner as to be lower than the maximum potential level of the digital key position signals by a certain value. In case where the maximum potential level is value "1023", the threshold REF is value "1020".

Figure 1:
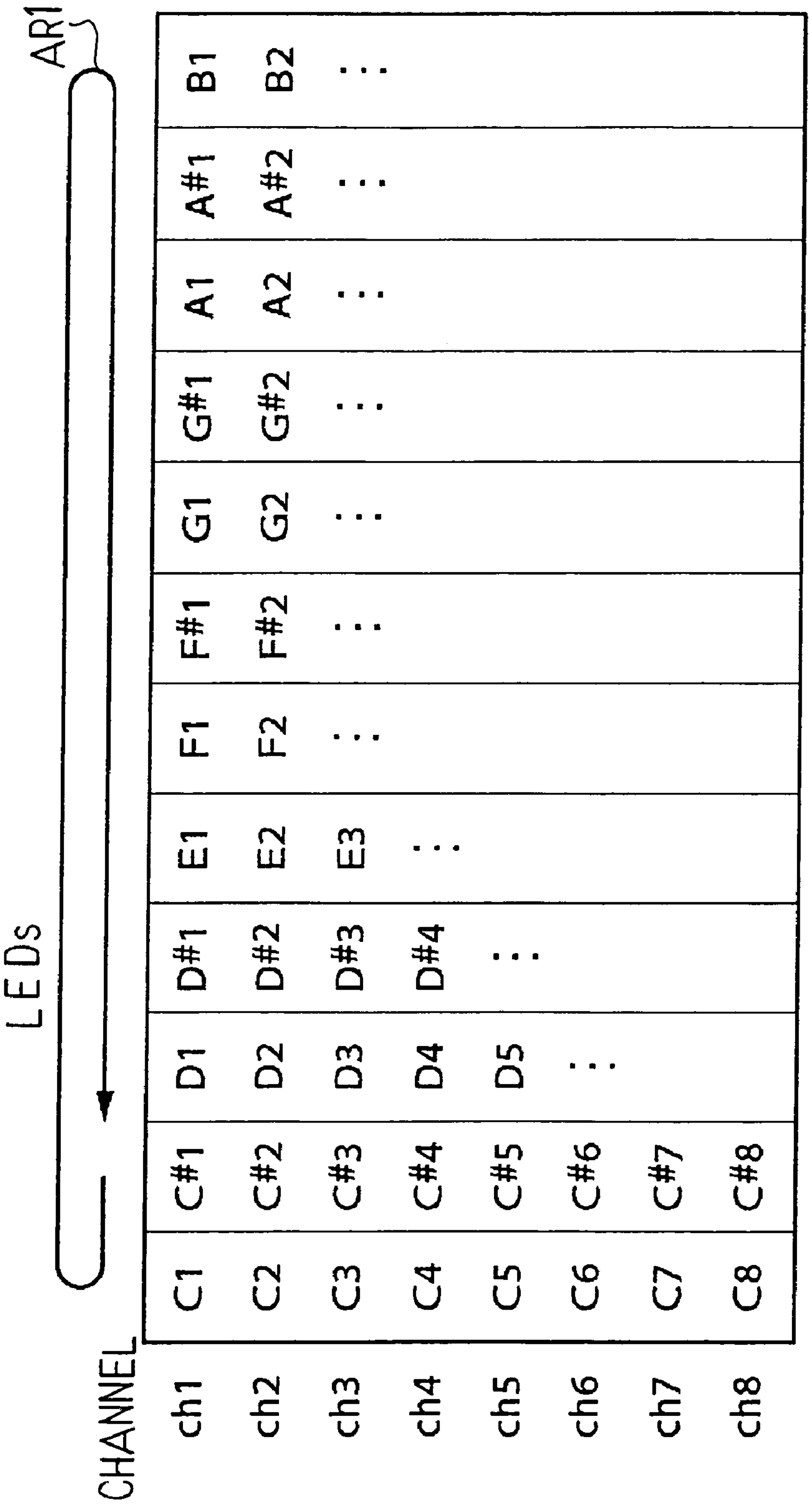
Fig. 1 PRIOR ART
FIG. 1 is a view showing the operation of the prior art optical transducer.

If the answer is given negative, the central processing unit 201 proceeds to step S504. If, on the other hand, at least one of the digital key position signals exceeds the threshold REF, the answer is given affirmative, and the central processing unit 201 changes the luminescence led(x) to from led(0) to led(1) as by step S503, and returns to step S502. The central processing unit 201 is assumed to notice the digital key position signal at the key assigned D2, which belongs to the key group consisting of D1, D2, D3, D4, D5, . . . as shown in FIG. 1, exceeding the threshold REF as in the box drawn by the broken line (see FIG. 7(A)), the central processing unit 201 repeats the jobs at step S502 at the next luminescence led(1). In FIGS. 7A to 7F, the boxes drawn by broken lines stand for the digital key position signals exceeding the threshold REF, and the numerals in the matrixes shown in FIGS. 7A to 7F are indicative of the output nodes CHO(7) to CHO(0) of the resistor strings RS. The channel numbers "ch1", "ch2", "ch3", "ch4", "ch5" . . . are indicative of the key position signals CHO(Y1), CHO(Y2), CHO(Y3), CHO (Y4), CHO(Y5) . . . , respectively.

If all the digital key position signals are lower in potential level than the threshold REF at the luminescence led(1) as shown in FIG. 7B, the answer is given negative at step S502. If not, the central processing unit 201 changes the select signal CL2 to the next bit pattern at step S503, and repeats the step S502. In this manner, the central processing unit 201 reiterates the loop consisting of steps S502 and S503 until all the binary values are equal to or less than the threshold REF. The luminescence led(x) for each current-to-light converter 224-1, . . . or 224-12 is temporarily memorized in the random access memory 203.

Subsequently, the central processing unit 201 changes the potential level control signal CL3 to the bit pattern indicative of the input node "0" so that the multiplexers 12 transfer the potential level at the input nodes "0" to the respective output nodes COM. Thus, the bias level of the key position signals CHO(Yn) is maximized as by step S504.

After the change of the bias level CHO(y) at step S504, the central processing unit 201 changes the select signal CL2 to the bit pattern indicative of the first current-to-light converter 224-1 and the luminescence control signal CL1 to the bit pattern indicative of the luminescence led(x) determined at the steps S501 and S502. The central processing unit 201 fetches the digital key position signals CHO(Y1) to CHO(Y8), and compares the binary values of the digital key position signals CHO(Y1) to CHO(Y8) with the threshold REF to see whether or not any one of the binary values exceed the threshold REF as by step S505. If the central processing unit 201 notices a binary value greater than the threshold REF, the central processing unit 201 changes the potential control signal CL3 to the bit pattern indicative of the next input node "1" or bias level CHO(1) as by step S506, and checks the digital key position signals CHO(Y1) to CHO(Y8) for the binary value greater than the threshold REF, again.

On the other hand, when all the binary values are equal to or less than the threshold REF, the central processing unit 201 changes the select signal CL2 and luminescent control signal CL1 to the bit pattern indicative of the next current-to-light converter 224-2 and bit pattern indicative of the luminescence determined for the next current-to-light converter 224-2, and fetches the digital key position signals CHO(Y1) to CHO(Y8) to see whether or not any binary value exceeds the threshold REF. In this manner, the central processing unit 201 reiterates the loop consisting of steps S505 and S506 until all the combinations between the current-to-light converters 224-1 to 224-12 and the digital key position signals CHO(Y1) to CHO(Y8) are examined.

FIG. 7C shows that ten combinations cause the binary values to exceed the threshold REF at the luminescence led(0). Although the central processing unit 201 stepwise changes the bias level CHO(y) to CHO(1) and further to CHO(2), seven combinations cause the binary values to exceed the threshold REF at the luminescence led(1) (see FIG. 7D), and three combinations cause three binary values to exceed the threshold REF at the luminescence led(2) (see FIG. 7E). However, when the central processing unit 201 changes the bias level to CHO(3) for the light-to-current converters 225-2, 225-3, all the combinations cause the binary values not to exceed the threshold REF as shown in FIG. 7F. Thus, the central processing unit 201 determines that the optimum luminescence and optimum bias level CHO(y) are led(1) and CHO(0)/CHO(1)/CHO(2)/CHO(3). For example, let's us focus our attention to the channel ch2 or the light-to-current converter 225-2. The current-to-light converters 224-1 to 224-12 are assumed sequentially to emit the light at the optimum luminescence led(1). When the current-to-light converter 224-1 emits the light, the optimum bias level CHO(2) is optimum for the light-to-current converter 225-2. When the current-to-light converters 224-2 and 224-3 emit the light, the bias level CHO(3) is optimum for the light-to-current converter 225-2. When the current-to-light converter 224-4 emits the light, the bias level CHO(1) is optimum for the light-to-current converter 225-2. When the current-to-light converters 224-5, 224-6, . . . emit the light, the bias level CHO(0) is optimum for the light-to-current converter 225-2.

Finally, the central processing unit 201 memorizes the optimum bias levels CHO(y) and optimum luminescence led(x) in the random access memory 203 as by step S507, and, thereafter, returns to the initialization program.

As will be understood from the foregoing description, the bias controllers 230-1 to 230-8 are provided in association with the light-to-current converters 225-1 to 225-8 as well as the luminescence controller 140 for the current-to-light converters 224-1 to 224-12, and the luminescence controller 140 cooperates with the bias controllers 230-1 to 230-8 so as periodically to optimize the luminescence led(x) and bias level CHO(y).

This feature results in that the optical transducer system 18 according to the present invention is free from the individuality of the component parts. Moreover, since the optimization is periodically carried out, the optical transducer system 18 according to the present invention is further free from the aged deterioration. Finally, the values of the key position signals are always varied in the numerical range closer to the threshold REF, which in turn is lower than the maximum value at which the photo-current is to be saturated. This means that most of the magnitude of the key position signals is representative of the current key position. In other words, the noise component is negligible. The key position signals are surely varied at a high signal-to-noise ratio without the saturation. Thus, the optical transducer system 18 according to the present invention exactly measures the physical quantity such as, for example, the current key position or actual key stroke at the high signal-to-noise ratio.

Moreover, the optimization is easy and speedy, because the central processing unit 201 only selects one of the bias levels.

Second Embodiment

Figure 8:
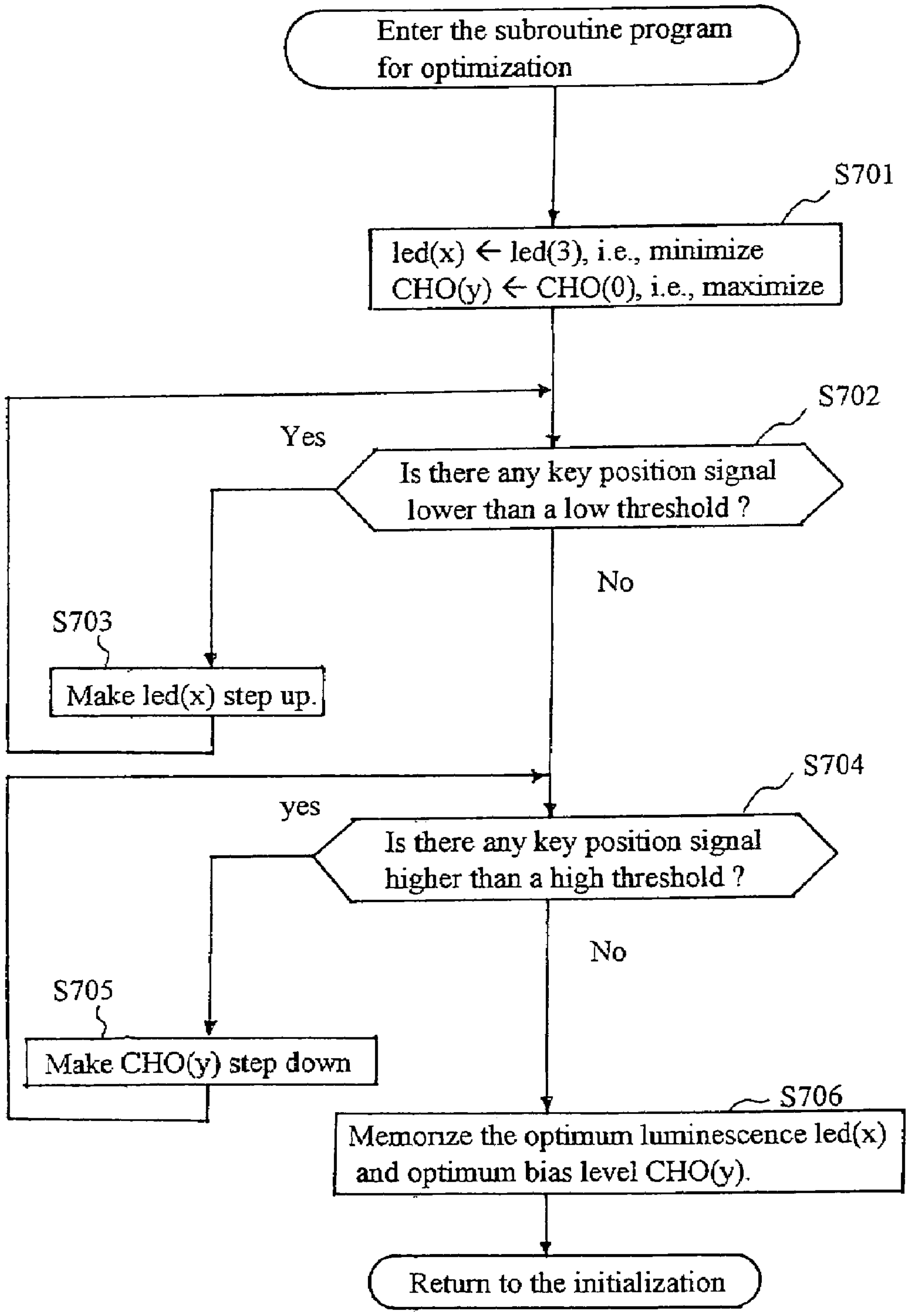
FIG. 8 is a flowchart showing another method for optimizing an optical transducer system incorporated in another automatic player piano according to the present invention.

FIG. 8 shows another method for optimizing the luminescence led(x) and bias level CHO(y). An automatic player piano implementing the second embodiment is similar to the automatic player piano described as the first embodiment. For this reason, description is focused on a computer program, which expresses the method, and component parts of the automatic player piano are hereinbelow labeled with references same as those designating the corresponding component parts of the above-described automatic player piano.

When the optical transducer system 18 is powered, the central processing unit 201 starts to initialize the system, and enters a subroutine program for the optimization during the initialization. The central processing unit 201 firstly changes the luminescent control signal CL1 to the bit pattern indicative of the minimum luminescence led(3) and the potential control signal CL3 to the bit pattern indicative of the maximum bias level CHO(0) as by step S701. The luminescent control signal CL1 keeps both n-p-n bipolar transistors 108*a*, 109 in the off-state so that the current is only supplied from the power source PS through the resistor 105*a* to the current-to-light converters 224, and the multiplexers 12 connects the input nodes "0" to the output nodes COM so as to transfer the maximum bias level CHO(0) to the amplifiers 226-1 to 226-8.

Subsequently, the central processing unit 201 changes the select signal CL2 to the bit pattern indicative of the first current-to-light converter 224-1 so that the first current-to-light converter 224-1 emits the light at the minimum luminescence led(3). The light is incident on the light-to-current converters 225-1 to 225-8, and the photo current gives rise to the potential at the output nodes P0 to P7 of the resistor strings RS. The potential level at the output nodes P0 is transferred through the multiplexers 12 and the amplifiers 226-1 to 226-8 to the analog-to-digital converters 223, and the central processing unit 201 fetches the binary values of the digital key position signals CHO(Y1) to CHO(Y8). The central processing unit 201 writes the binary values in the random access memory 203.

Subsequently, the central processing unit 201 changes the select signal CL2 to the bit pattern indicative of the next current-to-light converter 224-2, and writes the binary values in the random access memory 203. Thus, the central processing unit 201 sequentially changes the select signal CL2 to the other bit patterns, and writes the binary values for the other current-to-light converters 224-3 to 224-12.

Upon completion of the data write-in for the last current-to-light converter 224-12, the central processing unit 201 checks the random access memory 203 to see whether or not any one of the binary values is lower than a low threshold UR, which is slightly higher than the minimum potential level which is output from the light-to-current converters 225 in the absence of light as by step S702.

When the central processing unit 201 finds a binary value lower than the low threshold UR, the central processing unit 201 changes the luminescence control signal CL1 to the bit pattern indicative of the luminescence led(2) as by step S703, and writes the binary values of the digital key position signals CHO(Y1) to CHO(Y8) in the random access memory 203 to see whether or not any one of the binary values is lower than the low threshold UR at the step S702, again.

FIG. 9A shows that the binary value "Ka" of the digital key position signal CHO(Y2), which is produced through the light-to-current converter 225-2, is lower than the low threshold UR when the current-to-light converter 224-5 emits the light at the minimum luminescence led(3). The central processing unit 201 changes the luminescence control signal CL1 to the bit pattern indicative of the luminescence led(2) for the current-to-light converters 224-1 to 225-12. Then, the digital key position signal CHO(Y2) increases the binary value equal to or greater than the low threshold UR as shown at the corresponding position in FIG. 9B.

The central processing unit reiterates the loop consisting of steps S702 and S703 until the binary values, which were less than the low threshold UR at the previous luminescence led(x), become equal to or greater than the low threshold UR. When the binary values are equal to or greater than the low threshold UR, the answer at step S702 is given negative, and the central processing unit 201 proceeds to step S704. In case shown in FIG. 9A, when the binary value "Ka" becomes equal to or greater than the low threshold UR, the answer at step S702 is changed to the negative.

The central processing unit 201 accomplishes the following jobs at step S704. Since the luminescence led(x) is stepwise increased at step S703, some combinations between the current-to-light converters 224-1 to 224-12 and the light-to-current converters 225-1 to 225-8 may cause the binary value to exceed the high threshold REF. In this situation, the central processing unit 201 compares the binary values, which have been already stored in the random access memory 203 as shown in FIG. 9B, with the high threshold REF to see whether or not any one of the binary values exceeds the high threshold REF. In case shown in FIG. 9B, the binary values in the box drawn by the broken lines exceed the high threshold REF.

When the answer is given affirmative, the central processing unit 201 changes the potential control signal CL3 to the bit pattern indicative of the bias level CHO(1) for the light-to-current converter or converters, which made the binary value or values greater than the high threshold REF, as by step S704. In case shown in FIG. 9B, the central processing unit 201 changes the bias level from CHO(0) to CHO(1) for the light-to-current converters 225-1, 225-2 and 225-3. The central processing 201 fetches the binary values for all the combinations, and compares the binary values with the high threshold REF, again, to see whether or not any one of the binary values exceeds the high threshold REF at step S704. Three binary values are assumed to exceed the high threshold REF as shown in FIG. 9C. The answer at step S704 is given affirmative, again, and the central processing unit 201 changes the potential control signal CL3 to the bit pattern indicative of the bias level CHO(2). The central processing unit 201 fetches the binary values, and write the binary values in the random access memory 203, again, and compares the binary values with the high threshold REF, again, to see whether or not any binary value still exceeds the high threshold REF.

When all the binary values are equal to or less than the high threshold REF as shown in FIG. 9D, the central processing unit 201 memorizes the optimum luminescence and optimum bias levels in the random access memory 203 as by step S706, and returns to the initializing program. In case shown in FIG. 9D, the luminescence led(2) is optimum, and the bias level for the light-to-current converter 225-2 is changed to CHO(1) for the current-to-light converter 224-1, CHO(2) for the current-to-light converters 224-2/224-3 and CHO(0) for the current-to-light converters 224-4, 224-5, 224-6.

As will be understood, both of the current-to-light converters 224 and the light-to-current converters 225 are also optimized with assistance of the luminescence controller 140 and bias controller 230 of the optical transducer system implementing the second embodiment. The optical transducer system is also free from the individuality of the component parts and aged deterioration. Moreover, the current-to-light converters 224-1 to 224-12 emits the light at a relatively low luminescence led(x). This feature is different from those of the first embodiment, and is conducive to a long lift time of the current-to-light converters 224.

Third Embodiment

Figure 10:
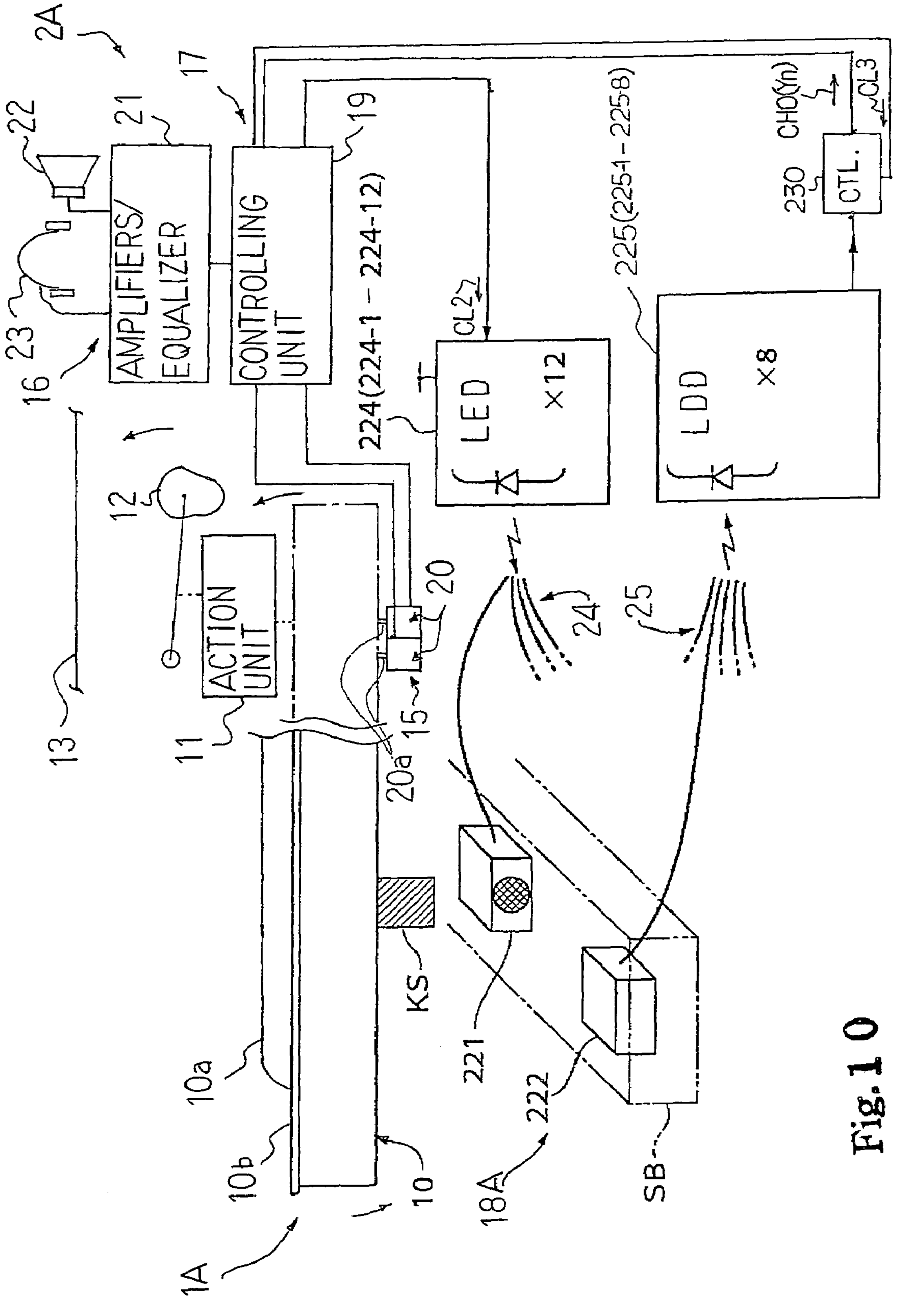
FIG. 10 is a schematic view showing another automatic player piano according to the present invention.

FIG. 10 shows another automatic player piano embodying the present invention. The automatic player piano embodying the present invention largely comprises an acoustic piano 1A and an electronic system 2A. The acoustic piano 1A is same as the acoustic piano 1, and component parts are labeled with references designating the corresponding parts of the acoustic piano 1A without detailed description. The electronic system 2A is similar to the electronic system 2 except for an optical transducer system 18A. For this reason, the other system components are labeled with references designating the corresponding system components, and description is focused on the optical transducer system 18A.

The optical transducer system 18A is only different in system configuration from the optical transducer system 18 in that the current-to-light converters 224 are not assisted with any controller. Only the bias controllers 230-1 to 230-8 are respectively connected between the light-to-current converters 225 and the analog-to-digital converters 223.

Accordingly, only the light-to-current converters 225-1 to 225-8 are adjusted to own values of the optimum bias level CHO(y) through a computer program expressing a method for optimizing the optical transducer system 18A. The computer program is simpler than those of the first and second embodiments, because the loop consisting of steps S502 and S503 or Steps S702 and S703 are not required for the optimization.

Since the current-to-light converters 224-1 to 224-12 are provided on upstream side of the light-to-current converters 225, the individuality of and aged-deterioration on the current-to-light converters 224 are influential in the amount of photo-current. In this situation, when the bias level CHO(y) is optimized, all the individuality and all the aged-deterioration are eliminated from the key position signals through the optimization work on the bias level CHO(y).

The optical transducer system 18A achieves the advantages of the above-described embodiments and another advantage, that is, the simplification of the system configuration and computer program.

Although particular embodiments of the present invention have been shown and described, it will be apparent to those skilled in the art that various changes and modifications may be made without departing from the spirit and scope of the present invention.

In the first and second embodiments, all the current-to-light converters 224-1 to 224-12 are adjusted to the common optimum value of the luminescence led(x). This feature does not set any limit to the technical scope of the present invention. The current-to-light converters 224-1 to 224-12 may be individually adjusted to own values of the optimum luminescence led(x).

The optical transducer system may be installed in a mute piano. The mute piano is a combination of an acoustic piano and a mute system. The mute system includes a hammer stopper and an electronic system. While the hammer stopper is staying at a free position, the pianist plays a piece of music on the acoustic piano, and the acoustic piano tones are generated from vibrating strings. When the pianist changes the hammer stopper to a blocking position, the hammer stopper enters trajectories of the hammers. While the pianist is playing the piece of music, the hammers rebound on the hammer stopper before reaching the strings, and the electronic system produces electronic tones instead of the acoustic piano tones. The optical transducer system according to the present invention forms a part of the electronic system, and the controller produces the music data codes on the basis of the key position signals. The music data codes are intermittently supplied to the tone generator, and the tone generator produces the audio signal on the basis of the music data codes. The tone generator may be deleted from the automatic player piano.

The optical transducer system according to the present invention may be provided in association with another sort of component parts of the acoustic piano such as, for example, the hammers, dampers, pedals or jacks.

The light radiating sensor heads 221 and light receiving sensor heads 222 do not set any limit to the technical scope of the present invention. A sensor head serves partially as the light radiating sensor head and partially as the light detecting sensor head. When the sensor head serves as the light radiating sensor head, two light beams are laterally radiated toward the adjacent sensor heads. On the other hand, when the sensor head serves as the light receiving sensor head, only one light beam is incident thereon. The sensor heads to be required for the keys are equal to the number of black, white keys plus one. Thus, the other sort of sensor heads is economical, and makes the arrangement of the sensor heads simple.

The number of current-to-light converters 224 and the number of light-to-current converters 225 do not set any limit to the technical scope of the present invention. If an apparatus only have a small number of the manipulators, two or three converters may be enough to measure the physical quantity of the manipulators.

The sensor heads 221, 222 and optical fibers 24, 25 may be deleted from an optical transducer system according to the present invention. In this instance, the current-to-light converters are directly opposed to the light-to-current converters. Thus, the sensor heads 221, 222 and optical fibers 24, 25 do not set any limit to the technical scope of the present invention. If the current-to-light converters are respectively opposed to the light-to-current converters, it is easy to specify objects represented by the electric signals. In other words, the feature disclosed in Japanese Patent Application laid-open No. Hei 9-54584 may not be employed in the optical transducer system according to the present invention.

The music data codes may be transferred from the controlling unit 19 to another musical instrument so as to produce the electronic tones through the musical instrument in a real time manner. The music data codes may and associated duration codes be transferred from the controlling unit 19 to a suitable database through a communication network. The floppy disk driver 250 is replaceable with another non-volatile memory driver such as, for example, a compact disk driver.

The light emitting diodes 224 and light detecting diodes 225 do not set any limit to the technical scope of the present invention. The light emitting diodes 224 may be replaced with lamps, and the light detecting diodes 225 may be replaced with light emitting transistors.

The circuit configuration of the luminescence controller 140 and circuit configuration of the bias controllers 230-1 to 230-8 do not set any limit to the technical scope of the present invention. The variable current source **100*a* may be implemented by current-mirror circuits, and the selector 111 may be connected between the variable current source 100*a* and the current-to-light converters 224-1 to 224-12. The resistor string RS and multiplexer 12** may be replaced with a parallel combination of field effect transistors different in channel dimensions. The resistor string RS may be replaced with a series combination of diodes.

The bipolar transistors **108*a*, 109, 111-1 to 111-3, field effect transistors 103, 104 and resistors 110-1 to 110-3 do not set any limit to the technical scope of the present invention. The bipolar transistors are replaceable with field effect transistors, and the field effect transistors are replaceable with bipolar transistors. The resistors 110-1, . . . 110-3** . . . may be replaced with diodes. The polarity of the bipolar transistors and polarity of the field effect transistors also do not set any limit to the technical scope of the present invention. The p-channel type field effect transistors may be changed to the n-channel type field effect transistors, and the n-p-n type bipolar transistors may be changed to the p-n-p type bipolar transistors.

The optical transducer system according to the present invention may determine another physical quantity such as, for example, velocity or acceleration. The optical transducer system is assumed to be expected to measure the velocity. The central processing unit approximates plural binary values of each digital position signal to a curve, and determines the gradient at a certain point on the curve.

Claim languages are correlated with the component members of the above-described embodiments as follows. The black and white keys **10*a*, 10*b* as a whole constitute "at least one moving object". The current-to-light converters 224-1 to 224-12, sensor heads 221 and optical fibers 24 as a whole constitute a "current-to-light converting unit", and the sensor heads 222, optical fibers 25 and light-to-current converters 225-1 to 225-8 form in combination a "light-to-current converting unit". The key position on the key trajectory or stroke of the black and white keys 10*a*, 10*b* is corresponding to a "physical quantity", and the key position signals CHO (Yn) serve as an "electric signal". The controlling unit 19** serves as a "data processor".

The resistor string RS is corresponding to a "voltage divider".

What is claimed is:

1. An optical transducer system for monitoring at least one moving object on a trajectory, comprising:

a current-to-light converting unit supplied with current for radiating light toward said trajectory at a luminescence;

a light-to-current converting unit receiving said light, and producing an electric signal representative of a physical quantity expressing motion of said at least one moving object on said trajectory and varied in dependence on said motion and said luminescence;

a bias controller connected to said light-to-current converting unit, and responsive to a bias control signal for adjusting the electric signal toward a target bias level; and a data processor supplying said bias control signal to said bias controller, and receiving said electric signal so as to determine said physical quantity.

2. An optical transducer system for monitoring at least one moving object on a trajectory, comprising:

a current-to-light converting unit supplied with current for radiating light toward said trajectory at a luminescence;

a light-to-current converting unit receiving said light, and producing an electric signal representative of a physical quantity expressing motion of said at least one moving object on said trajectory and varied in dependence on said motion and said luminescence;

a bias controller connected to said light-to-current converting unit, and responsive to a bias control signal for adjusting the electric signal toward a target bias level;

a data processor supplying said bias control signal to said bias controller, receiving said electric signal so as to determine said physical quantity, and checking said physical quantity on the condition that said at least one moving object stops at the outside of said light on said trajectory to see whether or not said bias level is optimum.

3. The optical transducer system as set forth in claim 2, in which said data processor decides said bias level to be optimum when said electric signal exhibits a potential level less than a high threshold close to a maximum output potential level of said light-to-current converting unit.

4. The optical transducer system as set forth in claim 3, in which said data processor decides said target bias level to be as low as possible in so far as said potential level is less than said high threshold.

5. The optical transducer system as set forth in claim 4, in which said current-to-light converter radiates said light at said luminescence as high as possible in so far as said electric signal exhibits said potential level less than said high threshold at said target bias level as low as possible.

6. The optical transducer system as set forth in claim 2, in which said data processor decides said bias level to be optimum when said electric signal exhibits a potential level between a high threshold close to a maximum output potential level of said light-to-current converting unit and a low threshold close to a minimum output potential level of said light-to-current converting unit.

7. The optical transducer system as set forth in claim 6, in which said data processor decides said target bias level to be as low as possible in so far as said potential level is found between said high threshold and said low threshold.

8. The optical transducer system as set forth in claim 7, in which said current-to-light converting unit radiates said light at said luminescence as low as possible, and in which said data processor decides said target bias level as high as possible in so far as said potential level is found between said high threshold and said low threshold.

9. The optical transducer system as set forth in claim 1, in which said bias controller includes a voltage divider connected to said light-to-current converter and having plural output nodes for outputting plural preliminary electric signals differently biased, and a multiplexer having plural input nodes respectively connected to said plural output nodes of said voltage divider and responsive to said bias control signal so as selectively to transfer said preliminary electric signals from said plural input nodes to said output node for producing said electric signal.

10. The optical transducer system as set forth in claim 9, in which said bias controller further includes an amplifier connected to said output node of said multiplexer so that said electric signal is supplied from said output node to said data processor.

11. The optical transducer system as set forth in claim 9, in which plural resistors connected in series serve as said voltage divider.

12. The optical transducer system as set forth in claim 1, further comprising a luminescence controller connected to said current-to-light converting unit and responsive to a luminescent control signal representative of a target luminescence for regulating said light to said target luminescence.

13. The optical transducer system as set forth in claim 12, in which said data processor checks said physical quantity on the condition that said at least one moving object stops at the outside of said light on said trajectory to see whether or not said luminescence and said bias level are optimum.

14. The optical transducer system as set forth in claim 13, in which said data processor decides said luminescence and said bias level to be optimum when said electric signal exhibits a potential level less than a high threshold close to a maximum output potential level of said light-to-current converting unit.

15. The optical transducer system as set forth in claim 14, in which said data processor decides said luminescence and said bias level to be as high as possible and as low as possible in so far as said potential level is less than said high threshold.

16. The optical transducer system as set forth in claim 13, in which said data processor decides said luminescence and said bias level to be optimum when said electric signal exhibits a potential level between a high threshold close to a maximum output potential level of said light-to-current converting unit and a low threshold close to a minimum output potential level of said light-to-current converting unit.

17. The optical transducer system as set forth in claim 16, in which said data processor decides said luminescence and said bias level to be as low as possible and as high as possible in so far as said potential level is found between said high threshold and said low threshold.

18. The optical transducer system as set forth in claim 12, in which said luminescence controller includes a variable current source connected to a power source and responsive to said luminescent control signal so as to vary the amount of said current flowing into said current-to-light converting unit.

19. The optical transducer system as set forth in claim 1, in which said at least one moving object has plural moving members independently moved on respective sub-trajectories of said trajectory, and in which said current-to-light converting unit and said light-to-current converting unit respectively have plural current-to-light converters associated with said plural moving members for radiating light beams toward said sub-trajectories and plural light-to-current converters associated with said plural moving members for receiving said light beams from the associated current-to-light converters.

20. The optical transducer system as set forth in claim 19, in which said bias controller includes plural bias controlling circuits connected to said plural light-to-current converters, respectively, so that each of said plural light-to-current converters regulates an electric sub-signal forming a part of said electric signal to said target bias level independently of the others of said plural light-to-current converters.

21. An optical transducer system for monitoring at least one moving object on a trajectory, comprising:

a plurality of optical transducers, each of said plurality of optical transducers, which has an individual characteristic, including;

a current-to-light converting unit supplied with current for radiating light toward the trajectory at a luminescence;

a light-to-current converting unit receiving the light, and producing an electric signal representative of a physical quantity expressing motion of said at least one moving object on the trajectory and varied in dependence on the motion and the luminescence;

a bias controller connected to said light-to-current converting unit, and responsive to a bias control signal so as to regulate a bias component of the electric signal to a target bias level; and a data processor adjusting the bias control signal to a target level at which influence of the individual characteristic of each of said plurality of optical transducers is substantially eliminated from the electric signal, supplying the bias control signal to said bias controller, and receiving the electric signal so as to determine the physical quantity.

* * * * *